United States Patent [19]

Matthies et al.

[11] Patent Number: 5,217,806
[45] Date of Patent: Jun. 8, 1993

[54] UV-STABILIZED FORMED STRUCTURES FROM AROMATIC POLYETHER KETONES

[75] Inventors: Hans G. Matthies, Ludwigshafen; Rainer Eichler, Lambsheim; Andrea Franz, Kaiserslautern, all of Fed. Rep. of Germany

[73] Assignee: BASF Aktiengesellschaft, Ludwigshafen, Fed. Rep. of Germany

[21] Appl. No.: 666,932

[22] Filed: Mar. 11, 1991

[30] Foreign Application Priority Data

Mar. 22, 1990 [DE] Fed. Rep. of Germany ....... 4009209

[51] Int. Cl.$^5$ .................... B32B 27/02; B32B 27/08
[52] U.S. Cl. .................... 428/375; 428/378; 428/394; 428/524; 428/525; 428/913
[58] Field of Search ............... 428/265, 288, 375, 378, 428/394, 524, 913, 525; 427/372.2, 384, 393.5; 252/403, 588

[56] References Cited

U.S. PATENT DOCUMENTS

| | | | |
|---|---|---|---|
| 3,987,001 | 10/1976 | Wedel et al. | 428/520 |
| 4,288,631 | 9/1981 | Ching | 568/333 |
| 4,323,597 | 4/1982 | Olson | 427/160 |
| 4,556,606 | 12/1985 | Olson | 428/412 |
| 4,600,647 | 7/1986 | Robeson et al. | 428/412 |
| 4,861,651 | 8/1989 | Goldenhersh | 428/255 |
| 5,045,396 | 9/1991 | Lin et al. | 428/412 |

FOREIGN PATENT DOCUMENTS

86/04592  8/1986  World Int. Prop. O. .

Primary Examiner—George F. Lesmes
Assistant Examiner—Christopher Brown
Attorney, Agent, or Firm—Keil & Weinkauf

[57] ABSTRACT

UV-stabilized formed structures from aromatic polyether ketones are coated with at least one film-forming polymer containing at least one UV absorber dissolved or dispersed in said film-forming polymer.

3 Claims, No Drawings

UV-STABILIZED FORMED STRUCTURES FROM AROMATIC POLYETHER KETONES

Polyether ketones, for example as described in DE-C-2,433,278, have a high melting point, for example 350° C. or higher, and are suitable for manufacturing high temperature resistant articles.

However, to protect their excellent performance characteristics they need to be stabilized to UV radiation. Owing to the high melting point and the associated high processing temperatures, it has been found to be very difficult to add UV stabilizers directly to the melt of the polyether ketone, since UV stabilizers tend to decompose at the high temperatures required.

U.S. Pat. No. 4,089,996 discloses treating the surface of formed articles from aromatic polysulfones, such as films, with a mixture of tin and titanium compounds to obtain stabilization to UV radiation. Apart from the fact that this is very expensive, it has not proved suitable for aromatic polyether ketones.

It is an object of the present invention to achieve effective stabilization of formed structures from aromatic polyether ketones to UV radiation, to avoid any damage to the stabilizers and to provide an inexpensive way of achieving such stabilization.

We have found that this object is achieved by a UV-stabilized formed structure from an aromatic polyether ketone, coated with at least one film-forming polymer containing at least one UV absorber dissolved or dispersed in said film-forming polymer.

The present invention further provides a process for producing a UV-stabilized formed structure from an aromatic polyether ketone, which comprises coating a formed structure from an aromatic polyether ketone with a solution or dispersion of a film-forming polymer which is inert toward polyether ketones and contains at least one UV absorber in solution or dispersion, and removing the solvent or dispersion medium at elevated temperature to leave a polymer film.

The novel UV-stabilized formed structures from aromatic polyether ketones have the advantage that both the applied polymer film and the UV stabilizer dissolved or dispersed therein absorb ultraviolet radiation. The novel process has the advantage of permitting the application of a plurality of layers of various polymers and/or various UV absorbers to the formed structures from aromatic polyether ketones. The novel process has the further advantage that it is uncomplicated and that the UV stabilizers are not exposed to high temperatures. Finally, the novel process has the advantage that the UV-stabilizing coating is firmly adherent to the formed polyether ketone structures.

Suitable aromatic polyether ketones advantageously have a relative viscosity of more than 1.0, for example from 1.2 to 1.8, in particular from 1.3 to 1.7, measured in each case in 0.5% strength by weight in 96% strength by weight sulfuric acid at 25° C. Preferred polyether ketones are composed of repeat structural units of the formulae I to V

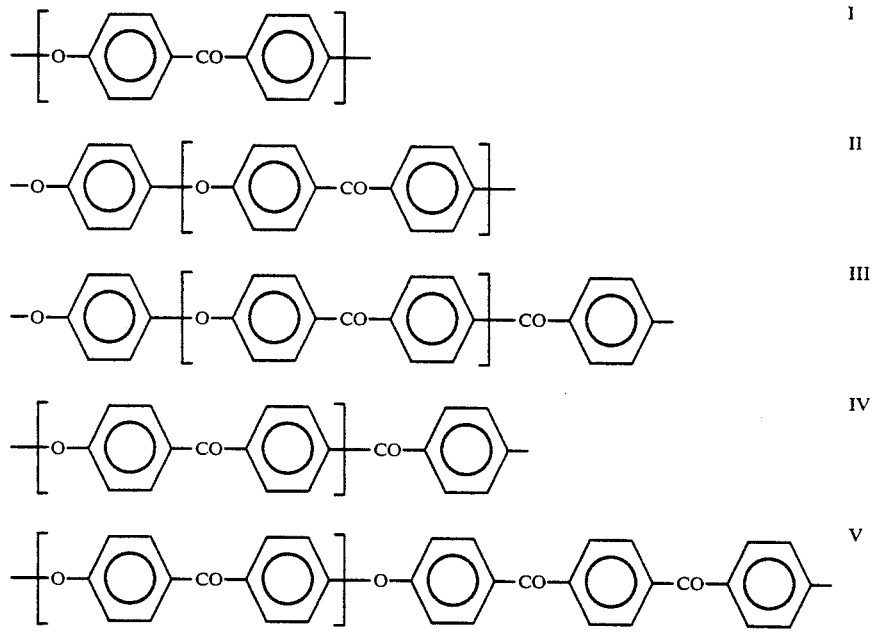

It is also possible to use copolymers in which up to 50% of the CO groups have been replaced by $SO_2$ groups, by 1,4-phenylene units or by 4,4'-bisphenylene units.

Formed structures for the purposes of the present invention are in general structures formed from the melt, in particular films, filaments and fibers and also woven, knitted or nonwoven structures produced therefrom. Particular preference is given to melt-spun filaments and fibers which have been subjected to drawing, for example with a draw ratio of from 1.2:1 to 10:1.

The formed structures from aromatic polyether ketones have a coating comprising at least one film-forming polymer containing at least one UV absorber dissolved or dispersed in said film-forming polymer.

Suitable film-forming polymers are for example polyvinyl alcohol, polyvinyl acetate, polyvinyl propionate, polyvinylpyrrolidone, polymers of (meth)acrylic esters, and copolymers of such (meth)acrylic esters and aromatic vinyl compounds such as styrene.

Other suitable film-forming polymers are polyamides, prepared for example from 7-, 8-, 9-, 10- or 11-membered lactams, eg. caprolactam, and polyamides prepared from dicarboxylic acids, for example $C_6$-$C_{12}$-dicarboxylic acids and diamines, for example $C_6$-$C_{15}$-diamines. Suitable starting materials are for example adipic acid and azelaic acid on the one hand and hexamethylenediamine, octamethylenediamine, 4,4'-dicyclohexylmethane or 4,4'-dicyclohexylpropane on the other. Suitable polymers also include copolymers of the starting materials mentioned.

Further suitable film-forming polymers are aromatic polysulfones composed of repeat units of the formula VI

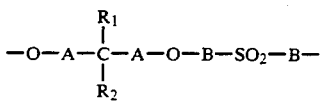     VI where A and B may be identical or different and each is 1,4-phenylene or 1,7-naphthylene and B may also be 4,4'-biphenylene, and $R_1$ and $R_2$ may be identical or different and each is alkyl of from 1 to 4 carbon atoms, and/or repeat units of the formula VII

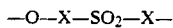     VII where X is 1,4-phenylene, 4,4'-biphenylene or 1,7-naphthylene. Suitable examples of repeat units of the formulae VI and VII are for example those of the formulae VIII, IX and X

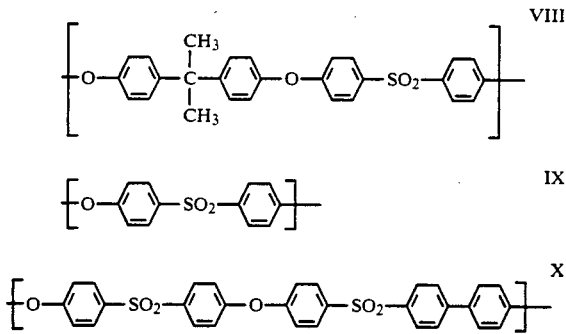

Particularly preferred film-forming polymers are polyacrylic esters and acrylic acid copolyesters and also polysulfones and polyether sulfones.

Suitable UV absorbers are for example sterically hindered phenols such as 5-methyl-3-dodecylphenol, di-tert.-amylphenol and 4-tert.-octylphenol and substituted benzophenones such as bis(2,4-dihydroxy)benzophenone and bis(2-hydroxy-4-methoxy-6-sulfonato)-benzophenone.

Further suitable UV absorbers are for example benzotriazoles such as 2-(2-hydroxy-3-dodecyl-5-methylphenyl)benzotriazole, and 1,6-hexanediol bis-3-(3-benzotriazol-N-yl-4-hydroxy-5-tert.-butyl)phenylpropanoate.

The formed structures from aromatic polyether ketone are completely enrobed with a coating of film-forming polymer containing a UV absorber The enrobing coat is in general from 10 to 50μ in thickness. The enrobing coat may comprise a single layer or a plurality, for example up to three, layers The individual layers may consist of identical film-forming polymers or different film-forming polymers for each layer. The film-forming polymer coating generally contains from 5 to 40% by weight of UV absorber, based on the enrobing polymer coat. The enrobing coat may contain a plurality of UV absorbers If a plurality of layers of film-forming polymer are employed, each layer may also contain a different UV absorber.

If filaments and fibers are enrobed, the enrobing coat generally comprises from 2 to 20% by weight, in particular from 5 to 15% by weight, based on the weight of the fibers or filaments.

The novel UV stabilized formed structures from aromatic polyether ketones are advantageously obtained by a process comprising coating a formed structure from an aromatic polyether ketone with a solution or dispersion of a film-forming polymer which is inert toward polyether ketones and contains at least one UV absorber in solution or dispersion, and removing the solvent or dispersion medium at elevated temperature to leave a polymer film.

According to the present invention, solvents are used in which polyether ketones are insoluble.

Suitable solvents are for example water, alkanols, for example alkanols of from 1 to 4 carbon atoms, esters thereof with lower fatty acids, for example of from 1 to 4 carbon atoms, sulfoxides such as dimethyl sulfoxide, and N-disubstituted carboxamides such as dimethylformamide, N-dimethylacetamide, N-diethylacetamide or N-methylpyrrolidone. The solvent is chosen according to the solubility of the aforementioned polymers in such solvents. It is also possible to use mixtures of such solvents.

Suitable solutions are for example polyvinyl alcohol in water, polyvinyl acetate in alcohols or esters, polyamides in alcohols or N-methylpyrrolidone, and polyether sulfones in N-methylpyrrolidone or dimethylformamide, whereas polymers of acrylates and copolymers of acrylates and styrene are in general employed in the form of aqueous dispersions.

The proportion of film-forming polymer in the solution is advantageously from 5 to 20, in particular from 7 to 15, % by weight. The weight ratio of film-forming polymer to UV absorber is within the range from 2:1 to 10:1, in particular from 3:1 to 8:1.

The solution or dispersion of film-forming polymer and UV absorber is advantageously applied to the formed aromatic polyether ketone structure by dipping or spraying to produce a uniform coating. The solvent or dispersion medium is then removed at elevated temperature, for example at from 50° to 250° C. depending on the boiling point of the solvent or dispersion medium, to form a polymer film. The coating operation may with advantage be repeated, for example once or twice, in which case the subsequent coating(s) may each contain other film-forming polymers and/or UV absorbers.

The formed structures according to the present invention may contain customary additives, for example soluble dyes, pigments, whiteners, brighteners and the like.

The Examples which follow illustrate the present invention.

COMPARATIVE EXAMPLE 1

A polyether ketone composed of the repeat unit

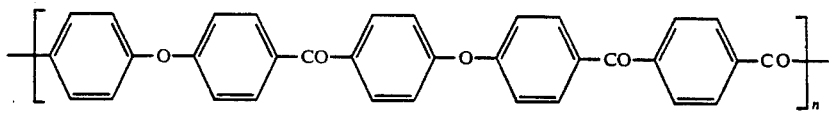

and having a relative solution viscosity of 1.478, measured in a solution of 0.5 g of the polymer in 100 ml of 96% strength $H_2SO_4$ at 25° C., was spun in a conventional manner at a melt temperature of 415° C. into a multifilament yarn, which was drawn at 250° C. in a draw ratio of 3:1. The filaments had the following properties:

Linear density: 109/30 dtex
Breaking strength: 5 cN/dtex
Elongation at break: 12%

The filaments were exposed for 7 days in a Xenotest 450 (from Heräus) to determine the light and UV stability.

After 7 days, irradiation at 30° C./65% relative humidity, the filaments had lost 50% of their original breaking strength and the elongation at break had dropped to 5%.

COMPARATIVE EXAMPLE 2

Polyether ketone filaments were produced as described in Comparative Example 1 and coated with a solution of 10 g of $SnCl_2 \cdot 2 H_2O$ and 12.6 g of tetraisopropyl titanate in 20 g of absolute ethanol and 10 g of glacial acetic acid at room temperature in such a way as to leave an add-on of about 7% on the dried fiber.

After 7 days irradiation in a Xenotest 450 the strength had dropped to 51% of the original value and the elongation at break was only 6% The adhesion to the fiber of the stabilizing compounds was poor, and the distribution of the stabilizing compounds on the fiber surface was nonuniform.

EXAMPLE 1 (according to the present invention)

Polyether ketone filaments produced as described in Comparative Example 1 were coated continuously with a solution of 7 g of a polyether sulfone composed of the repeat unit

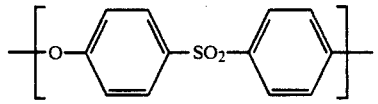

and having a relative solution viscosity of 1.313, measured in 1% strength in NMP at 25° C., and 3.5 g of a UV stabilizer (2,4,2',4'-tetrahydroxybenzophenone) in 89.5 g of N-methylpyrrolidone in such a way as to leave an add-on of 7% on the fiber after drying at 230° C. The adhesion to the fiber of the filmlike coating of stabilizing substances was good even after the Xenotest. Following 7 days irradiation in a Xenotest 450 the strength of the filaments was still 84% of the original value and the elongation at break was still 10%.

EXAMPLE 2 (according to the present invention)

Polyether ketone filaments produced as described in Example 1 were coated continuously with a solution of 7 g of a polysulfone composed of the repeat unit

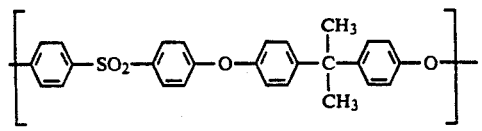

and having a relative solution viscosity of 1.306, in 1% strength in NMP at 25° C., and 1 g of a UV stabilizer of the formula

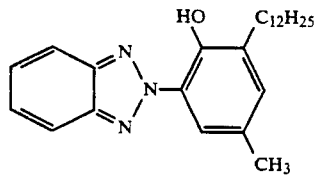

in 92 g of N-methylpyrrolidone in such a way as to leave an add-on of 8% on the fiber after drying at 230° C.

The adhesion of the filmlike stabilizer system to the fiber was good even after the Xenotest. Following 7 days, irradiation in the Xenotest 450, the strength of the filaments was still 76% of the original value and the elongation at break was still 10%.

EXAMPLE 3 (according to the present invention)

A fabric formed from polyether ketone filaments as described in Example 1 was coated batchwise with a solution containing 7 g of polyether sulfone and 3.5 g of 2,4,2',4'-tetrahydroxybenzophenone in 100 g of N-methylpyrrolidone. After drying at 230° C. to remove the solvent, the coated fabric was irradiated in a Xenotest 450 for 7 days. The result was a breaking strength still amounting to 56% of the original value.

EXAMPLE 4 (according to the present invention)

Polyether ketone filaments as described in Example 1 were dyed with 2% by weight of a soluble yellow dye and coated as described in Example 1. After 7 days irradiation of the filaments in a Xenotest 450, the breaking strength was still 87% of the original value.

We claim:
1. A UV-stabilized formed structure from an aromatic polyether ketone, coated with a film-forming polyaryl sulfone or a copolymer thereof, containing at least one UV absorber selected from the group consisting of sterically hindered phenols, benzotriazoles, hydroxybenzophenones and mixtures thereof dissolved or dispersed in said film-forming polymer.

2. The UV-stabilized formed structure from an aromatic polyether ketone of claim 1, which formed structure is a filament, fiber or film formed from the melt.

3. A formed structure from an aromatic polyether ketone according to claim 1, wherein the polyaryl sulfone is at least one of the repeat units

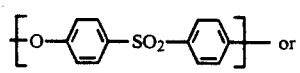 or

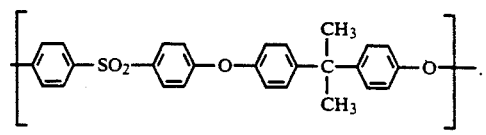

\* \* \* \* \*